Nov. 8, 1949    V. L. THOMPSON    2,487,082
SCREW THREAD TESTER
Filed March 13, 1945

Inventor
Virgil L. Thompson,
By
Attorney

Patented Nov. 8, 1949

2,487,082

UNITED STATES PATENT OFFICE 2,487,082

SCREW THREAD TESTER

Virgil L. Thompson, St. Louis, Mo.

Application March 13, 1945, Serial No. 582,475

4 Claims. (Cl. 33—199)

(Granted under the act of March 3, 1883, as amended April 30, 1928; 370 O. G. 757)

The present invention relates generally to gauges for checking threads of an internally screw-threaded bushing and more particularly to a tool for checking the threads of Rivnuts, which are fastened as a rivet and have an internal thread of a screw nut and are used in the construction of aircraft.

It is an object of the invention to provide a simple and efficient tool for quickly determining whether or not the screw threads of a Rivnut are in satisfactory condition.

Another object of the invention is the provision of a tool that may be accurately centered over the bore of an internally threaded bushing and one which will perform its function in a minimum period of time and without causing damage to the surface through which the bushing passes.

With the above and other objects in view the invention consists in the construction, combination and arrangement of parts as will be described more fully hereinafter.

Figure 1:
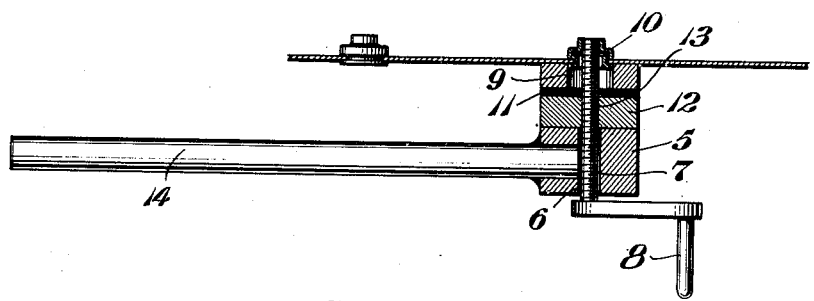
Figure 2:
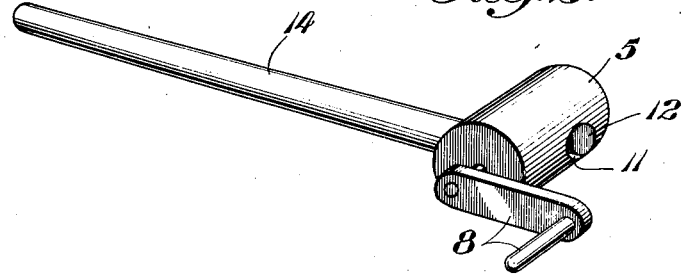
Figure 3:
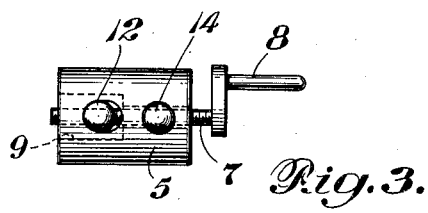

Reference is to be had to the accompanying drawings, forming a part of this specification, in which like reference characters indicate corresponding parts throughout the various views, and in which Fig. 1 is a side elevational view, partly in section, showing the tool in operable position, Fig. 2 is a perspective view of the tool, and Fig. 3 is an end view of the tool.

"Rivnuts" are customarily used along the leading edge of an aircraft wing to hold the de-icing mechanism and in such other places where it is desirable to have a rugged internal thread of substantially greater length than the thickness of the material will allow if the threads are formed in the material itself. They are usually fastened to thin sheet material to serve as an anchor nut or attaching means for a stud or screw where it is inconvenient or impracticable to use the ordinary screw nut. Their use facilitates assembly work considerably and at the same time provides a strong anchor thread. Frequently the internal thread of a "Rivnut" becomes damaged in riveting it in place or the threads may be otherwise ruptured in use to such an extent that the screw or stud cannot be properly inserted. In order to assure rapid and proper assembly of parts, it is desirable to make sure the screw or stud can be easily screwed into position before the assembly work begins. To determine if the threads of the "Rivnuts" are in good condition to admit the screw and hold it securely, the threads are checked after installation and periodically thereafter. This checking, heretofore, has been done with a screw and screwdriver, a method which has its disadvantages. In using such tools, it not infrequently happens that the screw-driver will slip causing either a serious tear or mutilation of the surface surrounding the Rivnut, particularly in the case of the fabric covering an aircraft wing. The tool now to be described will eliminate the probability of such accidental damage as it is so designed that it may be accurately centered over the bore of the Rivnut before the checking element is inserted thereinto precluding physical contact between the element and the fabric.

Referring more particularly to Fig. 1 of the drawings, 5 indicates a cylindrical body member having a central longitudinal bore 6 adapted to receive a thread checking element 7 that is rotatable within the bore through the medium of a crank member 8. The diameter of the bore at the end opposite the crank is somewhat enlarged, as at 9, so that it may have a snug fit over the head of a Rivnut 10. The body member 5 is provided with a transverse bore 11 for the reception of a guide member 12 having a diameter smaller than that of the transverse bore so that there may be movement of the guide laterally with respect to the axis of the transverse bore. The guide member is provided with a threaded bore 13 through which the threaded checking element 7 is operable. A handle 14 secured to the body in any suitable manner facilitates the manipulation and operation of the tool.

The tool is centered in operative position by placing the enlarged portion 9 of the longitudinal bore over the head of the Rivnut. In the initial positioning of the tool it may happen that the checking element 7 will not be exactly over the bore of the Rivnut and were it not for the leeway permitted for movement of the guide member, it would drag on the wing fabric in moving the tool for centering. The distance the guide member is permitted to move should be sufficiently great to allow the checking element to ride over the rim of the Rivnut. The guide member not only allows free movement of the checking element but also holds it in proper position to be inserted in the Rivnut.

It will be understood that the above description and accompanying drawings comprehend only the general and preferred embodiment of the invention and that various changes in details of construction, proportion and arrangement of parts may be made within the scope of the appended claims and without sacrificing any of the advantages of the invention.

The invention described herein may be manufactured and used by or for the Government of the United States for governmental purposes without the payment to me of any royalty thereon and therefor.

What is claimed is:

1. A tool for checking the threads of an internally threaded member comprising a body member having a longitudinal bore, a portion of which is enlarged to fit over the threaded member, a thread checking element operable within the bore, a guide member in the body arranged transversely of the bore for maintaining the element in operable position, and means carried by the checking element for rotating said element in the bore.

2. A tool for checking the threads of an internally threaded member comprising a body member having a longitudinal bore of varying diameter and a transverse bore, a guide member in said body and disposed in and movable transversely of the said second bore and having a threaded opening therethrough, a thread checking element operable within the longitudinal bore and engaging with the threads in the opening in the guide member, and crank means on the checking element for rotating said element in the body member.

3. A tool for checking the threads of an internally threaded member comprising a body member having a longitudinal bore of varying diameter including an enlarged terminal portion to fit over the threaded member, a thread checking element operable within the bore and having a threaded end of less diameter than said terminal portion of said bore to engage the internal threads of said threaded member, a guide member in the body member arranged transversely of said bore and having a threaded opening in threaded engagement with the said element, and driving means connected to said element for imparting rotary movement thereto.

4. A tool according to claim 3 in which said body is provided with a transverse bore receiving said guide member, said transverse bore being of greater diameter than that of said guide member providing for movement of the guide member laterally with respect to the axis of the transverse bore in applying the thread checking element to the member to be checked.

VIRGIL L. THOMPSON.

REFERENCES CITED

The following references are of record in the file of this patent:

UNITED STATES PATENTS

| Number | Name | Date |
|---|---|---|
| 1,588,361 | Hanson | June 8, 1926 |
| 1,879,398 | Mirfield | Sept. 27, 1932 |